(12) United States Patent
Freeston et al.

(10) Patent No.: US 7,321,588 B2
(45) Date of Patent: Jan. 22, 2008

(54) SERIAL CONTROL OF RADIO FREQUENCY INTEGRATED CIRCUITS

(75) Inventors: Andrew K. Freeston, Windham, NH (US); Paul J. Schwab, Hudson, NH (US)

(73) Assignee: M/A-COM, Inc., Lowell, MA (US)

( * ) Notice: Subject to any disclaimer, the term of this patent is extended or adjusted under 35 U.S.C. 154(b) by 1197 days.

(21) Appl. No.: 10/244,652

(22) Filed: Sep. 16, 2002

(65) Prior Publication Data

US 2004/0052255 A1  Mar. 18, 2004

(51) Int. Cl.
*H04L 12/56* (2006.01)
(52) U.S. Cl. .................. 370/392; 370/338
(58) Field of Classification Search ............ None
See application file for complete search history.

(56) References Cited

U.S. PATENT DOCUMENTS

| | | | |
|---|---|---|---|
| 4,689,740 A | 8/1987 | Moelands et al. | |
| 4,730,320 A | 3/1988 | Hidaka et al. | 371/38 |
| 5,311,508 A * | 5/1994 | Buda et al. | 370/476 |
| 5,642,350 A * | 6/1997 | Dailey | 370/439 |
| 6,130,602 A * | 10/2000 | O'Toole et al. | 340/10.33 |
| 6,711,181 B1 * | 3/2004 | Xue et al. | 370/504 |
| 2002/0061753 A1 | 5/2002 | Lysejko et al. | 455/450 |
| 2002/0158711 A1 | 10/2002 | Groves et al. | 333/174 |
| 2003/0185250 A1 * | 10/2003 | Harberts et al. | 370/535 |

OTHER PUBLICATIONS

The I²C-BUS Specification, Version 2.1, Jan. 2000, pp. 1-46.

* cited by examiner

*Primary Examiner*—Duc Ho

(57) ABSTRACT

A serial controller for use in controlling various radio frequency (RF) modules within an RF integrated circuit is disclosed. The serial controller is coupled to an serial bus that internal to the RFIC that transmits commands and data from a microcontroller to a data receiver module within the serial controller. The serial commands and data are transmitted across the serial bus in a data packet format having an address-overhead portion and a data portion, wherein the data receiver module removes the address-overhead bits from the packet and provides the data portion of the packet as output data. A decoder/coder logic module coupled to the data receiver receives the serial data and is operative to process the serial data and in response thereto activate one or more control signals. An RF module includes at least one circuit and one or more switching elements that are coupled to the one or more control signals. The switching elements are responsive to the corresponding control signals by switching one or more switchable component into the circuit or isolating the switchable component from the circuit to adjust or change one or more parameter of the circuit so as to vary the output of the RF module in a controlled manner.

10 Claims, 4 Drawing Sheets

SERIAL CONTROL OF RADIO FREQUENCY INTEGRATED CIRCUITS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Most electronic devices in use today include some form of intelligent control that is typically a single chip microcontroller. This microcontroller can be used to control general purpose integrated circuits that are used within the electronic device.

Cellular telephones, wireless modems, and wireless personal data assistants (PDAs) use a variety of radio frequency (RF) integrated circuits (RFICs) to provide connectivity to voice and data networks. Due to the nature of the wireless communications used in these devices, intelligent controllers are used to control the RFICs to optimize communications parameters such as signal-to-noise ratio and automatic volume control. These RFICs typically use GaAs ICs in which adding additional logic functionality to these RFICs increases the size, power and current consumption, and cost of the RFIC. Accordingly, to reduce the amount of logic required on GaAs chips a parallel bus is used to communicate between the microcontroller and the various RFICs. Thus, the number of lines that must be provided for each RFIC is equal to N*M where N is the number of bits in a data word and M is the number of RFICs.

However, as the size of integrated components used on a GaAs RFIC has decreased the power consumption of logic gates has decreased as well. In addition, as the interconnecting line size and circuit cell size decrease, parasitic effects between conductors in the RFIC increase. In particular, the large number of conductor interconnects used in the parallel bus between the microcontroller and the various RFICs creates parasitic inductances, capacitances, and cross talk interference. These parasitic effects reduce the data rate of the internal data communications between the controller and the various RFICs and may generate RF interference that can radiate and affect other components within the RFIC or the electronic device.

It would be desirable, therefore, to provide a communication link between a microcontroller and one or more control modules on an RFIC that does not require a parallel bus connection to transmit control and data messages to various RFICs.

BRIEF SUMMARY OF THE INVENTION

A serial controller for controlling various radio frequency (RF) modules within one or more RF integrated circuit (RFIC) is disclosed. The serial controller includes a data receiver that receives commands and data from a microcontroller via the serial data bus. The serial commands and data are transmitted across the serial bus in a data packet format, wherein the data receiver module removes any address-overhead bits from the packet and provides the data portion of the data packet as an output. A decoder module is coupled to the data receiver and receives the data portion from the data receiver. The decoder module is operative to process the data portion of the data packet and, in response thereto, to activate or deactivate one or more control signals on one or more control signal lines. A RF module is coupled to the decoder module. The RF module includes at least one RF circuit and one or more switching elements that are coupled to the one or more control signals. The RF module further includes a switchable component that can be switched into or isolated from the RF circuit. The one or more switching elements are responsive to the corresponding control signals by electrically connecting the switchable component into the RF circuit or electrically isolating it from the RF circuit. In this way, one or more parameters of the RF circuit can be adjusted to provide a desired output signal or function.

Other forms, features, and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
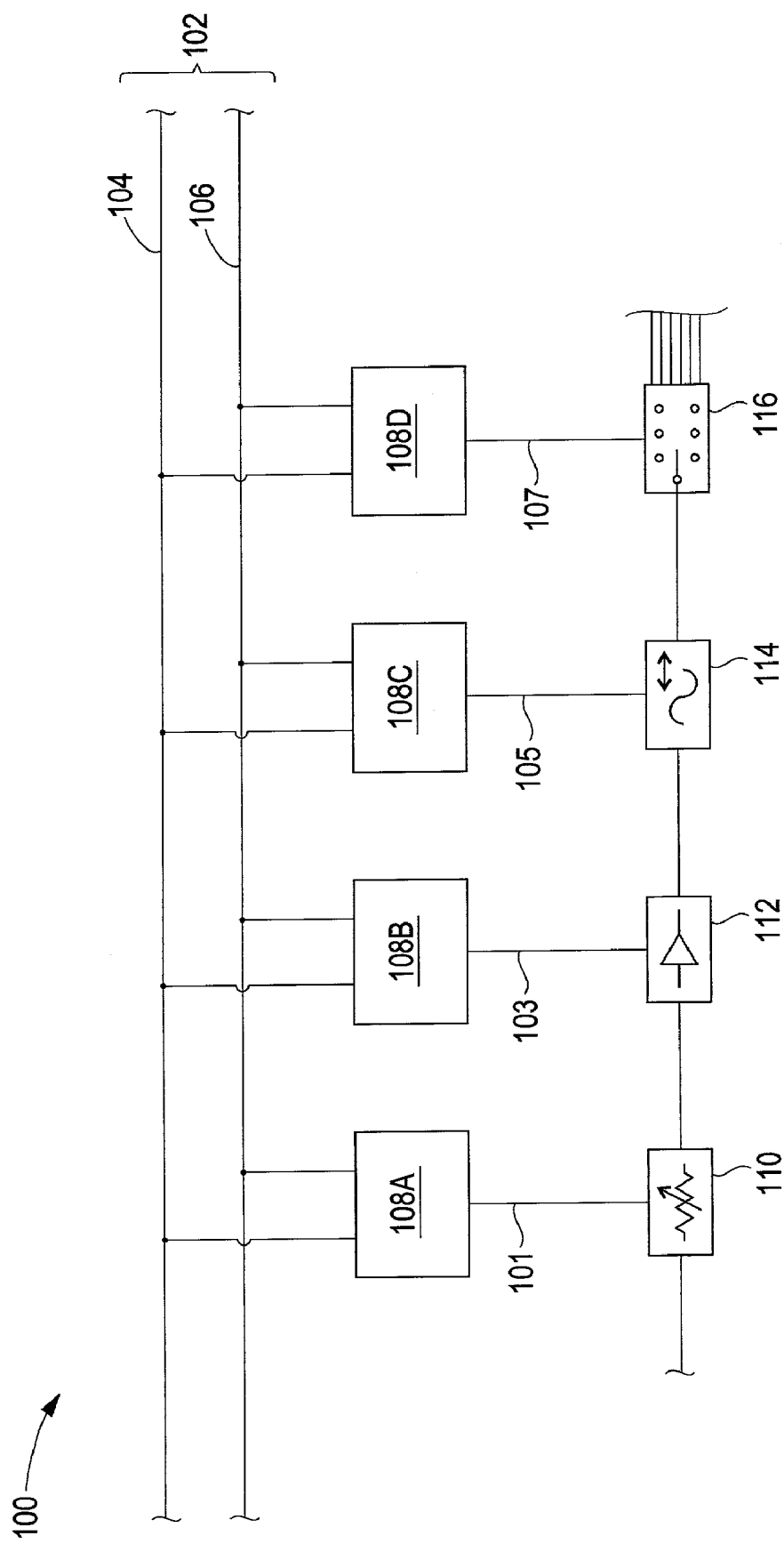
FIG. 1 is a block diagram of an embodiment of the serial controller for RF modules within an RFIC described herein.

FIGS. 1–4 depict various embodiments of a serial controller for controlling one or more radio frequency (RF) modules contained within an RF integrated circuit (RFIC) and interconnected to one another via a serial bus to a microcontroller. FIG. 1 depicts an embodiment of the serial controller 100 in which a plurality of communications/control modules 108A–D are coupled to a two-wire serial bus 102. The two-wire serial bus includes a serial clock signal line 104 and a serial data signal line 106. A microcontroller (not shown) provides serial clock signals on line 104 and serial data on line 106, wherein the data can include commands or other data. Each of the communications/control modules 108A–D is coupled to a corresponding RF module. In the embodiment depicted in FIG. 1, the communications/control module 108A is coupled to a variable attenuation module 110, the communications/control module 108B is coupled to a variable gain amplifier 112, the communications/control module 108C is coupled to a variable phase shifter module 114, and the communications/control module 108D is coupled to a switch matrix module 116.

Figure 5:
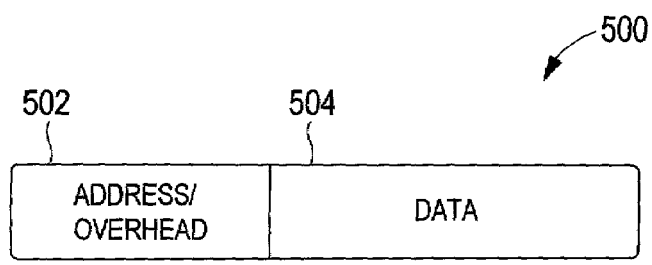
FIG. 5 is schematic representation of a data packet suitable for use with the embodiment described herein.

As discussed above, commands and data are transmitted via the two-wire serial data bus 102 in data packets. As depicted in FIG. 5, the serial data in the illustrated embodiment is transmitted in a data packet 500 that includes an address portion 502 and a data portion 504. Each data receiver module monitors the serial bus 102 and retrieves data packets that have an address portion 502 that corresponds to a predetermined unique address associated with the respective data receiver module. The data receiver module removes the data portion 504 from the retrieved data packet for processing. The data portion 504 of the data packet may contain commands and/or data that are decoded and processed to control the operation of the respective RF module coupled to the particular decoder module. The number of bits in the data packet and the number of bits provided for addressing and overhead functions such as CRC checking etc., are dependent upon the data transfer protocol being used. In a preferred embodiment, the data transfer protocol is the two wire $I^2C$-Bus protocol of the Philips Corp., as specified in the $I^2C$-Bus Specification version 2.1, January 2000, and incorporated herein by reference.

Each of the RF modules in the embodiments depicted herein performs a predetermined function on an input RF signal to provide an output signal having desired characteristics. For example, RF modules may attenuate an input signal, amplify an input signal, shift the phase of an input signal, or route an input signal to a selected one of a plurality of outputs. Each RF module includes a combination of active and/or passive components interconnected as a circuit suitable for performing the predetermined function. The circuit further includes at least one switchable component that can be switched into or isolated from the circuit to vary the functionality of the circuit and thereby change the input-output characteristics of the RF module. The switchable components do not however change the predetermined functionality of the RF module. For example, the switchable components may change the gain of an amplifier, the attenuation of an attenuator module, the amount of phase shift in a phase shifter, or switching the input signal to a different output port in a switching module.

The RF module is responsive to one or more control signals by switching the switchable component into or isolating it from the circuit. In the embodiment depicted in FIG. 1, communications/controller modules 108A–D provide control signals 101, 103, 105, and 107 to RF module 110, 112, 114, 116, respectively. The control signals 101, 103, 105, and 107 provided to the RF module 110 typically controls various switching elements within the corresponding RF module that are responsive to the control signals by opening and closing. In this way, the switching elements can either switch the switchable component into, or isolate it from, the associated circuit.

In general, active components such as transistors and passive components such as resistors, capacitor, inductors, and microstrip assemblies make up the circuits contained in the RF modules. The switching elements within the RF modules can be active switching elements such as transistors or diodes.

Figure 2:
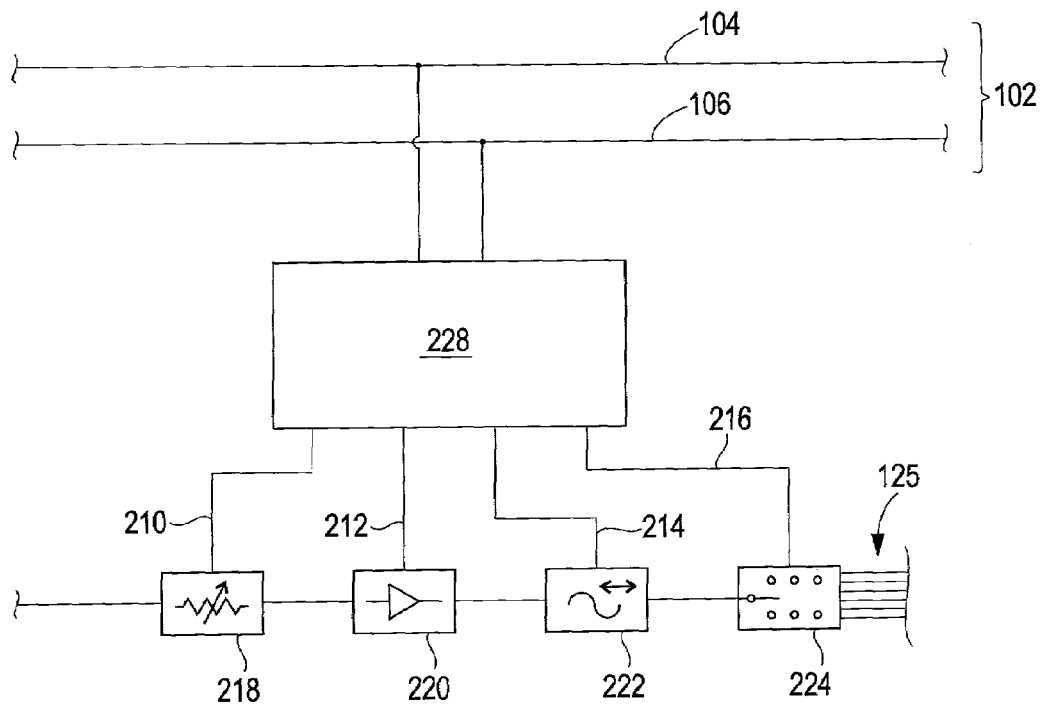
FIG. 2 is a block diagram of another embodiment of the serial controller for RF modules within an RFIC described herein.

In another embodiment depicted in FIG. 2, a single communications/controller module 228 is coupled to the two-wire serial bus 102 that includes serial clock line 104 and serial data line 106. The single communications/controller module 228 receives commands and data from a microcontroller (not shown) via the serial bus 102. The communications/controller module 228 interprets the commands and data received via the serial bus 102 and provides corresponding control signals 210, 212, 214, and 216 to a plurality of RF modules 218, 220, 222, and 224 respectively. As discussed above, the RF modules include a circuit and switching elements that are responsive to the control signals by switching a switchable component into, or isolating it from, the circuit.

Figure 3:
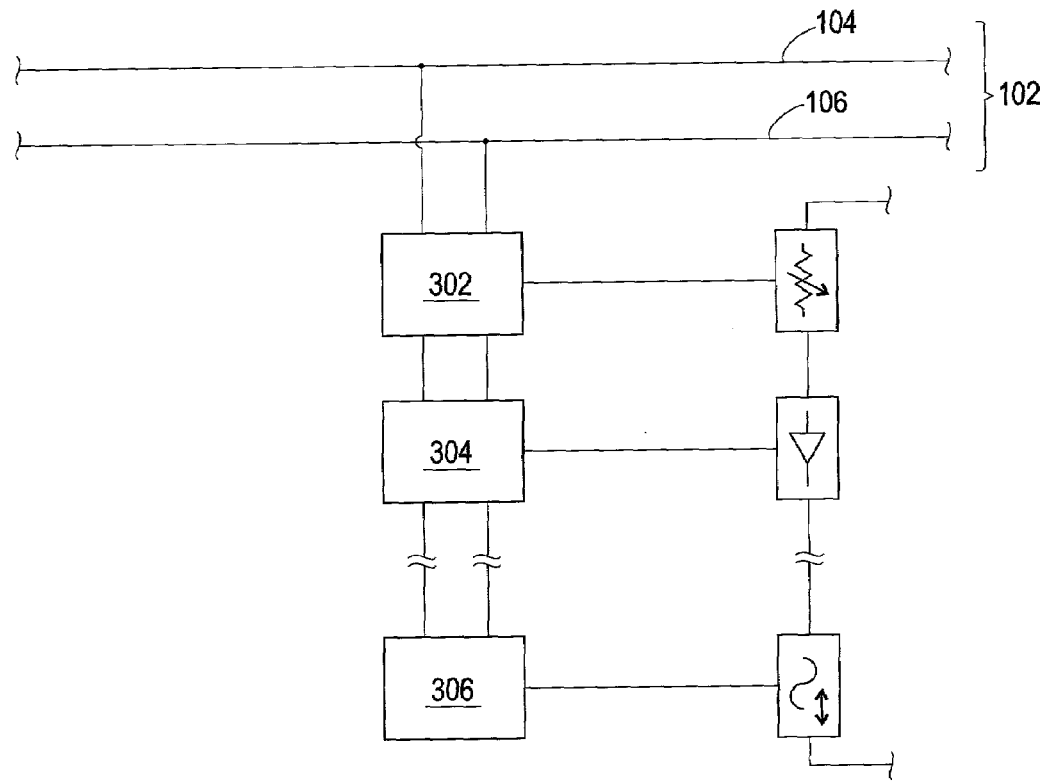
FIG. 3 is a block diagram of a daisy chained serial connection of the serial controller for RF modules within an RFIC depicted in FIG. 1.

FIG. 3 depicts another embodiment of the serial controller of FIG. 1 in which a plurality communications/controller modules 302, 304, and 306 are connected to a two-wire serial bus 102 in a serial daisy chain manner. The first communications/controller module 302 receives the serial data from the two-wire serial bus 102. The first communications/controller 302 retrieves only the data addressed to it and then passes the serial data to the subsequent communication/controller module 304 that repeats this process. Accordingly, each of the plurality of communications/controller modules retrieves only data addressed to it and passes the remaining serial data to the next subsequent communications/controller module in the daisy chain. In this manner the number of control modules can be increased without adversely affecting the electrical characteristics of the serial bus 102.

Figure 4:
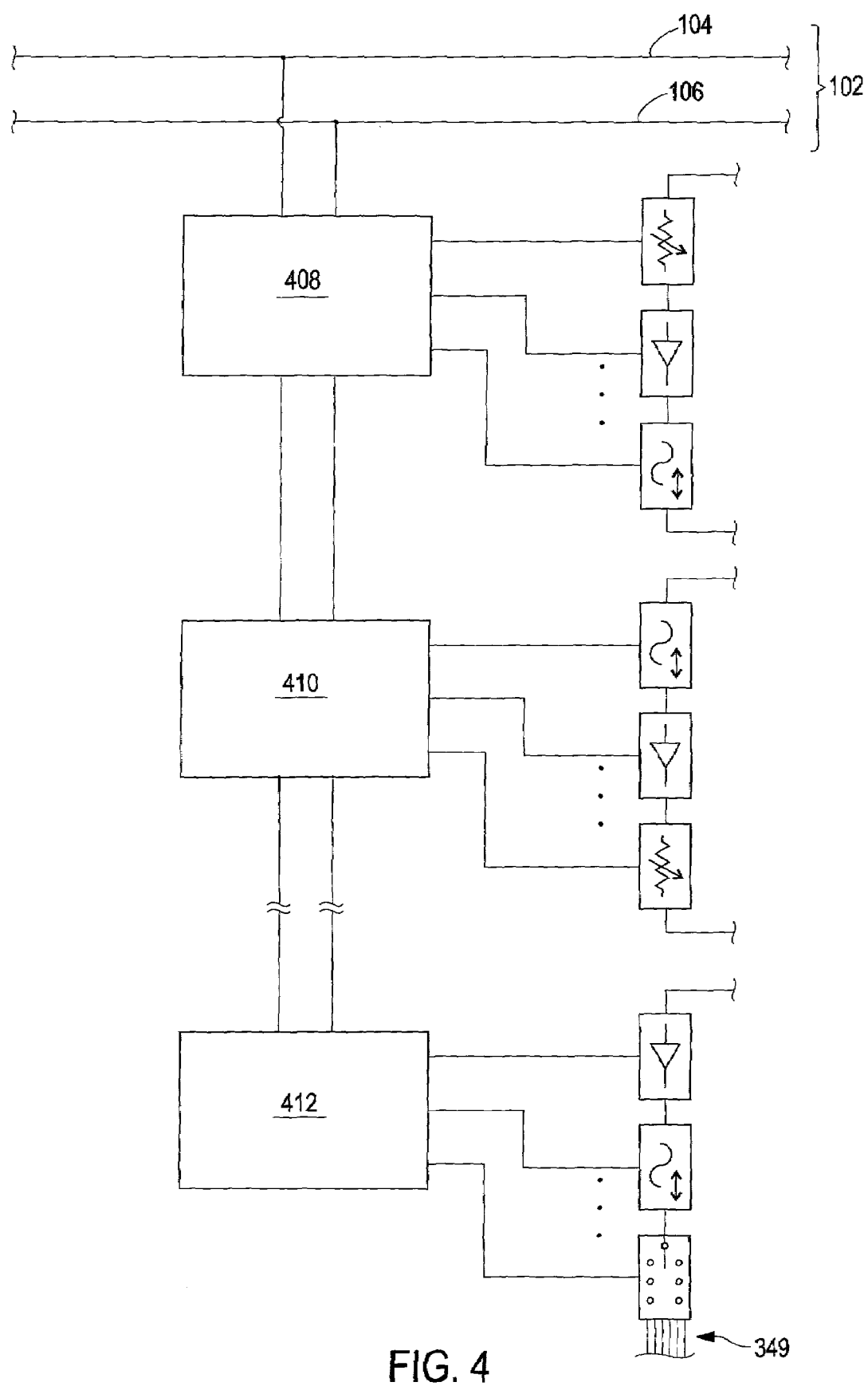
FIG. 4 is a block diagram of a daisy chained serial connection of the serial controller for RF modules within an RFIC depicted in FIG. 2.

FIG. 4 depicts another embodiment of the serial controller of FIG. 2 in which a plurality communications/controller modules 408, 410, and 412 are connected to a two-wire serial bus 102 in a serial daisy chain manner. The first communications/controller module 408 receives the serial data from the two-wire serial bus 102 and retrieves only the data addressed to it and then passes the serial data to the subsequent communications/controller module 410 that repeats this process. Accordingly, each of the plurality of communications/controller modules retrieves only data addressed to it and passes the remaining serial data to the next subsequent communications/controller module in the daisy chain. In this manner, the number of control modules can be increased without adversely affecting the electrical characteristics of the serial bus 102.

Figure 6:
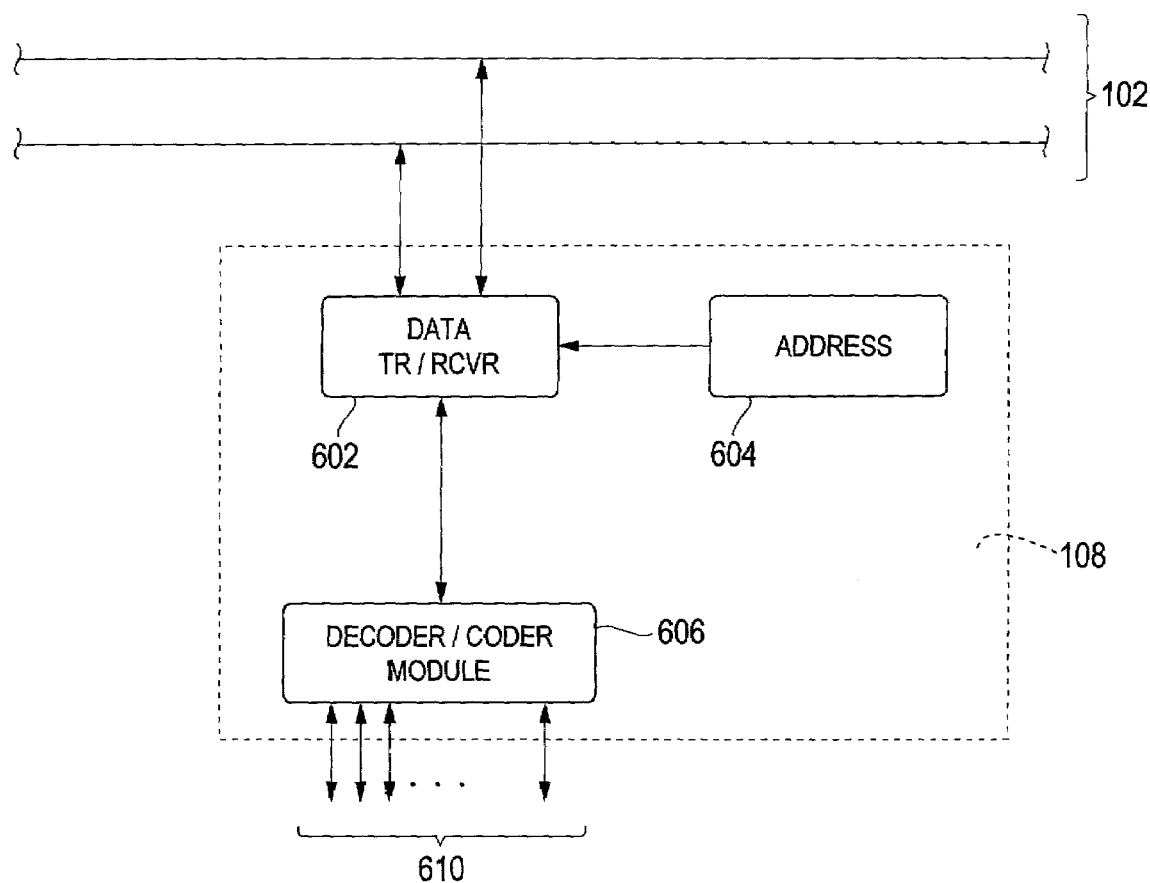
FIG. 6 is a block diagram of the communications/controller module depicted in FIGS. 1 and 2.

FIG. 6 depicts an embodiment of the communications/controller 108, 228. The communications/controller module includes an address module 604 that includes the unique predetermined address assigned to the associated communications/controller module. The communications module 602 monitors the serial data transmitted via the two-wire serial bus 102 and retrieves data packets having an address portion that corresponds to the unique predetermined address provided by the address module 604. The communications module 602 strips the address and overhead portion bytes from the retrieved data packets and provides the data portion of the data packet to the decoder/coder module 606. Decoder/coder module 606 receives the data contained in the retrieved data packet from the communications module and forms the data into command and data words. The decoder/coder module 606 decodes the command or data by activating or de-activating a control signal on one or more of the plurality of output lines 610. There may be any number of output lines 610, the actual number being a function of the overall system requirements. In addition, the control signals can be analogue signals that are intended to drive analog switches such as switching transistors or switching diodes and are sized accordingly. Alternatively, digital control signals that are designed to operate within specific voltage ranges defined by a digital logic family maybe employed. The decoder/coder module 606 can be a microprocessor or microcontroller programmed to decode the various commands and data and to activate or deactivate various circuits to turn on or off the corresponding control signals. Alternatively, digital logic circuits can be used, for example in a programmable logic array (PLA), applications specific integrated circuit (ASIC), programmable array logic (PAL), read only memory (ROM) that can be configured and arranged to decode the various commands and data and activate or deactivate the appropriate circuitry to turn on or off the corresponding control signals.

In another embodiment it may be advantageous for the RF module controlled by the communications/controller module to provide data such as status and/or state data to the microcontroller. In this embodiment, the decoder/coder module 606 senses status and/or state data using in known techniques and codes the sensed data into a predetermined data format. The decoder/coder module 606 provides the coded data in the predetermined format to the communications module 602 where the coded data is formatted into data packets according to the data transfer protocol employed on the serial bus 102. In a preferred embodiment in which the I$^2$C-Bus from Phillips Corp is used as the data transfer protocol, the communications module 602 must be able to provide serial clock pulses when transmitting sensed status and/or state data to the microcontroller.

Those of ordinary skill in the art should further appreciate that variations to and modification of the above-described methods and apparatus for current measurement can be made. Accordingly, the invention should be viewed as limited solely by the scope and spirit of the appended claims.

What is claimed is:

1. A serial controller receiving commands and data embedded in a serial data packet having a data portion and an address-overhead portion and transmitted via a serial bus, the serial controller coupled to the serial bus and responsive to the data portion by controlling a RF module contained within a radio frequency integrated circuit, the serial controller comprising:

an address module containing a unique predetermined address;

a data receiver module coupled to the serial bus and to the address module, the data receiver operative to identify and retrieve serial data packets from the serial bus having an address portion that corresponds to the unique predetermined address, the data receiver operative to remove the data portion of the serial data packet and to provide as an output the data portion of the serial data packet;

a decoder logic module coupled to the data receiver and receiving the data portion therefrom, the decoder logic module operative to decode the data portion and responsive to the decoded data portion to activate or deactivate one or more predetermined control signals in response to the decoded data portion; and a RF module including at least one circuit, a switching element coupled to the control signal, and a switchable component coupled to the switching element, the switching element responsive to the received control signal and operative to switch the switchable component into the circuit or to isolate the switchable component from the circuit.

2. The serial controller of claim 1 wherein the decoder logic module is a microprocessor.

3. The serial controller of claim 1 wherein the decoder logic module is digital logic.

4. The serial controller of claim 1 wherein the control signal is an analog control signal.

5. The serial controller of claim 1 wherein the control signal is a digital control signal.

6. The serial controller of claim 1 wherein the RF module is is selected from the group consisting of a variable-phase phase-shift module, a variable gain amplifier module, a variable attenuation module, a switching module.

7. The serial controller of claim 1 wherein the switchable component is a passive component selected from the group consisting of a resistor, a capacitor, an inductor, a microstrip assembly, a phase shift assembly, an attentuator assembly, and a switching assembly.

8. The serial controller of claim 1 wherein the switchable component is an active component selected from the group consisting of a GaAs transistor, a bipolar junction transistor, a MOSFET transistor, and an amplifier assembly.

9. The serial controller of claim 1, wherein the switching element is a switching diode.

10. The serial controller of claim 1 wherein the switching element is a switching transistor.

* * * * *